United States Patent [19]

Overath et al.

[11] Patent Number: 4,614,369
[45] Date of Patent: Sep. 30, 1986

[54] CONNECTOR ASSEMBLY FOR FIBER-REINFORCED PLASTIC PIPE MEMBERS

[75] Inventors: Friedhelm Overath, Schaffhausen; Remo Saner, Büsserach, both of Switzerland

[73] Assignee: Georg Fischer Aktiengesellschaft, Schaffhausen, Switzerland

[21] Appl. No.: 703,277

[22] Filed: Feb. 20, 1985

[30] Foreign Application Priority Data

Feb. 20, 1984 [CH] Switzerland ............................ 803/84

[51] Int. Cl.[4] .............................................. F16L 9/14
[52] U.S. Cl. ...................................... 285/55; 285/371; 285/373; 285/915
[58] Field of Search ............... 285/398, 371, 419, 421, 285/373, 55, 915

[56] References Cited

U.S. PATENT DOCUMENTS

| 969,943 | 9/1910 | Cronholm | 285/421 X |
| 3,975,039 | 8/1976 | Penneck et al. | 285/371 X |
| 4,147,381 | 4/1979 | Schwarz | 285/371 X |
| 4,159,132 | 6/1979 | Hitz | 285/421 X |
| 4,457,542 | 7/1984 | Shaefer et al. | 285/398 X |

FOREIGN PATENT DOCUMENTS

| 1232938 | 5/1971 | United Kingdom . |
| 1313242 | 4/1973 | United Kingdom . |
| 1329364 | 9/1973 | United Kingdom . |

Primary Examiner—Thomas F. Callaghan
Attorney, Agent, or Firm—Toren, McGeady, Stanger, Goldberg & Kiel

[57] ABSTRACT

A pair of pipe members, each including an inner pipe jacket consisting essentially of a thermoplastic material and an outer pipe jacket consisting essentially of a fiber winding impregnated synthetic resin, are joined together at their ends in a connector assembly which includes a pair of semi-circular shells engaged externally about the outer pipe jackets at each end of the pipe members, a pair of clamping rings in press-fitted engagement about the shells for pressing the shells against the pipe members and a pipe stub arranged internally of the pipe members in cooperative relationship with the inner pipe jackets to form a fluid-tight seal therebetween.

6 Claims, 2 Drawing Figures

CONNECTOR ASSEMBLY FOR FIBER-REINFORCED PLASTIC PIPE MEMBERS

The present invention is directed generally to assemblies for connecting together a pair of pipe members and more particularly to a connection assembly especially suited for joining together fiber-reinforced plastic pipes.

In the chemical industry, pipelines having an inner pipe jacket made from a thermoplastic material, for example, polyethylene, polypropylene, polyvinylchloride, or the like, and an outer jacket made from a fiber-reinforced laminate, for example, wound glass fibers impregnated with an unsaturated polyester resin or epoxide resin, are used for the transmission of fluid media, particularly corrosive fluid media. The outer laminate jacket serves as a reinforcement for the pipe members in order to enable transmission of a fluid media at higher pressures, but also for the purpose of absorbing external forces, for example, tensile-compressive or bending stresses, which may be exerted upon the pipeline.

In making connections between pipe members or between the pipe members and fittings, for example, an angle, a T-piece, or a reducer, it is important that the fluid media not come into contact with the outer jacket and that the external forces are essentially transmitted through the outer jacket.

Connectors for plastic pipes are known, for example, from DE-OS No. 2707492 and CH-PS No. 555 504. However, such devices are not suitable for connecting fiber-reinforced plastic pipes having an inner and outer jacket in a manner which can also satisfy requirements mentioned previously herein.

Accordingly, the present invention is directed toward provision of a connector assembly for fiber-reinforced plastic pipe members of the type previously mentioned which can be attached at cut-to-size pipes during pipe laying procedures and which will satisfy the aforementioned assumptions concerning the transmission of forces and the surfaces coming into contact with the medium being transmitted.

SUMMARY OF THE INVENTION

Briefly, the present invention may be described as a connection assembly for joining together two pipe members consisting essentially of fiber-reinforced plastic material. The assembly of the invention is designed to join together a pair of pipe members, each of which include an inner pipe jacket consisting essentially of a thermoplastic material and an outer pipe jacket consisting essentially of a fiber winding impregnated with synthetic resin. The pipe members are joined together end-to-end by a pair of semi-circular shells which extend to engage externally around both the outer pipe jackets at the ends of the pipe members and by a pair of clamping rings which extend about the semi-circular shells, one at each end of said pipe members with a press-fitted engagement about the shells in order to maintain the connection. A pipe stub is arranged internally of the pipe members at their joined ends in cooperative relationship with the inner pipe jackets so as to form a fluid-tight seal therebetween.

Thus, in accordance with the inventive features of the invention, there is provided a connection assembly, wherein the fluid medium being transmitted does not come into contact with the outer jacket and wherein forces are transmitted by means of the semi-circular shells onto the outer jacket of the parts to be connected in a positively locked way.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
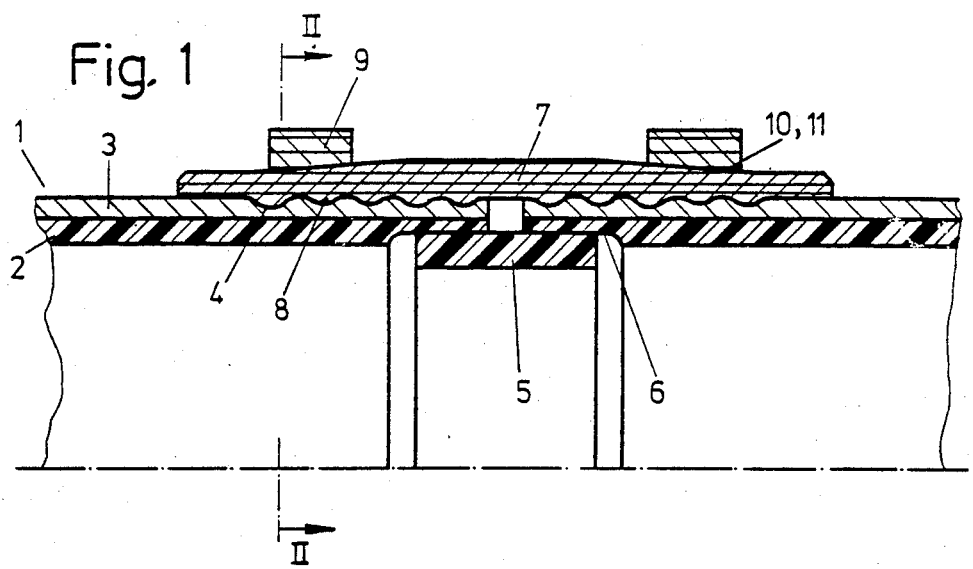
FIG. 1 is a longitudinal sectional view of a connection assembly for fiber-reinforced parts in accordance with the invention.

Referring now to the drawing, there is shown a connector assembly which joins together in a nondetachable manner a pair of pipe members 1. The pipe members 1 are joined end-to-end and they may, for example, constitute the ends of a pipe-shaped fitting as, for example, an arc-, angle-, T-piece or reduction muff. The pipe members 1 comprise an inner pipe jacket 2, which is made from thermoplastic material, for example, polyethylene, polyvinylchloride, etc., and an outer pipe jacket 3 consisting essentially of a fiber winding impregnated with synthetic resin. Preferably, a glass fiber laminate with unsaturated polyester resin or epoxide resin is used.

The outer pipe jacket is applied onto finished extruded pipes or prefabricated, for example, sprayed fittings, by means of a winding process and the outer pipe jacket is solidly joined with the inner jacket by means of an adhesive.

The end of each of the pipe members 1 is provided with circumferentially extending grooves 4 which are preferably designed with a wave-shaped configuration, the grooves being rounded with rounded-off transitions, as seen in cross-section. The grooves 4 are applied after a cutting-off process of the pipe members into desired lengths by means of mechanical machining.

Thereafter, the inner pipe jackets 2 at each of the ends of the pipe members 1 are solidly joined together by means of a pipe stub 5. The pipe stub 5 is respectively solidly fastened with the inner pipe jackets 2 by means of a welding or bonding connection whereby a concentric joinder of the two ends of the pipe members 1 is assured by providing each with a recess 6 concentric with the grooves 4. It is required for a good welding connection that the material of the pipe stub 5 correspond with the thermoplastic material of which the inner pipe jackets 2 are formed.

Figure 2:
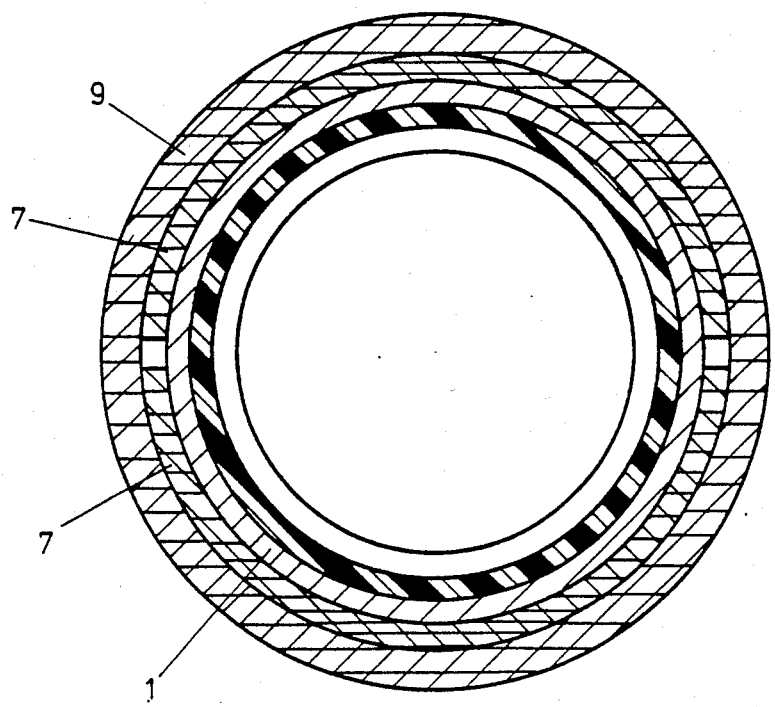
FIG. 2 is a sectional view taken along the line II—II of FIG. 1.

In order to ensure a solid connection of the two ends of the pipe members 1, which is capable of carrying tensile stresses, the outer pipe jacket 3 is connected in a positively locked manner by means of two half-shells 7, which are capable of being clamped on and which, as shown in the drawings, may have a semi-circular configuration, when viewed in cross-section. The semi-circular configuration of the shells 7 is shown in FIG. 2 and each of the shells 7 is formed with wave-shaped grooves 8 which are arranged on the inner circumference thereof and which are configured for mating engagement with the grooves 4 of the outer pipe jacket 3 in order to form a positive interlocking connection.

The two semi-circular shells 7 are clamped against the pipe members 1 by means of a pair of clamping rings 9 which are adapted to be axially forced over the two ends of the shells 7. Each of the clamping rings 9 is formed with a conical inner surface 10 and the shells 7 are formed with a conical outer surface 11 so that when the rings 9 are forced axially over the shells 7, there will develop a radial tensile stress by the axial pushing process. Thus, it will be seen that the rings 9 may be press-fitted about the shells 7 to retain the overall assembly in a locked condition.

The shells 7 and the clamping rings 9 are also fabricated from a laminate, preferably from glass fibers and synthetic resin.

In addition to the positive interlocking connection, the shells 7 are also advantageously connected with the pipe members 1 by means of a bonding connection which also acts as a seal. By means of this bonding process and/or the welding or bonding of the pipe stub 5 into the inner pipe jackets 2, a permanent connection is formed for the assembly of the invention.

For stiffening and improvement of the sealing action, preferably a metallic ring can be inserted into the pipe stub.

It will therefore be seen that the present invention provides a connection assembly joining together the ends of the pipe members 1, which pipe members are formed with grooves 4 on the outer pipe jacket 3 with mating grooves 8 being formed on the semi-circular shells 7. As a result of this configuration, a positively interlocking connection of the pipe members 1 may be achieved. The two shells 7 are held together by means of the clamping rings 9 and the inner pipe jacket 2, which consists of a thermoplast, is joined in a tightly sealed manner by means of the welded-in or bonded-in pipe stubs 5 so that the fluid medium being transmitted does not come into contact with the outer jacket at the location of the connection.

Through the utilization of grooves or protrusions designed in a wave-shaped form on the outer pipe jackets 3 and the semi-circular shells 7, notch effects are largely avoided. The additional bonding results in an assurance against loosening as well as the filling of possibly existing cavities or voids with cement which prevents permeation damage. The connecting assembly may be made directly at the assembly site without requiring prefabrication of fitted lengths.

Through a suitable selection of the thermoplastic materials for the inner pipe jacket and the cover ring, a high chemical durability of the connection may be assured.

While specific embodiments of the invention have been shown and described in detail to illustrate the application of the inventive principles, it will be understood that the invention may be embodied otherwise without departing from such principles.

What is claimed is:

1. A connection assembly for joining together two pipe members consisting essentially of fiber-reinforced plastic material comprising:
    a pair of pipe members, each including an inner pipe jacket consisting essentially of a thermoplastic material and an outer pipe jacket permanently bonded with said inner pipe jacket consisting essentially of a fiber winding impregnated with synthetic resin, said pipe members each having an end at which they are joined together;
    a pair of semi-circular shells engaging externally around both said outer pipe jackets at said ends of said pipe members and permanently bonded thereto;
    means for clamping said shells around said outer pipe jackets;
    pipe stub means joining said pipe members together concentrically with each other and extending across said ends internally of said pipe members in cooperative relationship with said inner pipe jackets so as to form a fluid-tight seal therebetween;
    grooves arranged on the outer circumference of said outer pipe jacket and complementary grooves arranged on the inner circumference of said semi-circular shells, said grooves and said complementary grooves being engaged with each other to form a positively interlocking connection between said pipe members;
    said grooves and said complementary grooves being designed with a smooth wave-shaped configuration extending in the longitudinal direction of said pipe members; and
    a bonding connection provided between said pipe members and said pair of shells.

2. An assembly according to claim 1, wherein said semi-circular shells are formed with conical outer surfaces and wherein said means for clamping comprise a pair of clamping rings, each having a conical inner surface in engagement with said conical outer surfaces of said shells, said clamping rings being placed in press-fitted engagement about said shells.

3. An assembly according to claim 1, wherein said pipe stub means consist essentially of the same thermoplastic material from which said inner pipe jacket is formed.

4. An assembly according to claim 1, wherein said semi-circular shells consist essentially of fiberglass impregnated with synthetic resin.

5. An assembly according to claim 1, wherein said means for clamping comprise a pair of clamping rings which consist essentially of glass fibers impregnated with synthetic resin.

6. An assembly according to claim 1, wherein said pipe stub means is connected with said inner pipe jacket by welding.

* * * * *